US012495726B2

(12) United States Patent
McGregor et al.

(10) Patent No.: US 12,495,726 B2
(45) Date of Patent: Dec. 16, 2025

(54) AUTOMATIC ENCODER CALIBRATION SYSTEM FOR AN AGRICULTURAL VEHICLE

(71) Applicant: CNH Industrial America LLC, New Holland, PA (US)

(72) Inventors: Scott McGregor, Chicago, IL (US); Aditya Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 18/467,544

(22) Filed: Sep. 14, 2023

(65) Prior Publication Data
US 2025/0089594 A1 Mar. 20, 2025

(51) Int. Cl.
*A01B 69/04* (2006.01)
*G05D 1/00* (2024.01)

(52) U.S. Cl.
CPC ......... *A01B 69/008* (2013.01); *G05D 1/0212* (2013.01)

(58) Field of Classification Search
CPC ............................ A01B 69/008; G05D 1/0212
USPC .......................................................... 701/50
See application file for complete search history.

(56) References Cited

U.S. PATENT DOCUMENTS

| 6,336,051 B1* | 1/2002 | Pangels ................ A01B 79/005 700/207 |
| 10,737,693 B2* | 8/2020 | Farooqi ................. B60W 30/12 |
| 11,859,658 B2 | 1/2024 | Kerner et al. |
| 2017/0122742 A1* | 5/2017 | Schleicher ............. G01C 21/14 |
| 2017/0293304 A1* | 10/2017 | Dang .................... B62D 15/029 |
| 2019/0375450 A1* | 12/2019 | Medagoda ......... B62D 15/0285 |
| 2023/0112003 A1* | 4/2023 | Krog ....................... B60L 1/003 172/1 |
| 2023/0135150 A1* | 5/2023 | Kale ..................... G01M 17/03 73/73 |

(Continued)

FOREIGN PATENT DOCUMENTS

| EP | 2980668 A1 * | 2/2016 | ........... B62D 15/025 |
| WO | WO-9846065 A1 * | 10/1998 | ............. G06V 20/56 |

OTHER PUBLICATIONS

Ziye, et al., "Tracking Control of Unmanned Tracked Vehicle in Off-road Conditions with Large Curvature," 2019 IEEE Intelligent Transportation Systems Conference (ITSC), Auckland, New Zealand, 2019, pp. 3867-3873, doi: 10.1109/ITSC.2019.8917468. (https://ieeexplore.ieee.org/document/8917468) (Year: 2019).*

*Primary Examiner* — Atul Trivedi
(74) *Attorney, Agent, or Firm* — Foley & Lardner LLP

(57) ABSTRACT

An agricultural vehicle includes a steering input device configured to steer the agricultural vehicle to perform a turn. The agricultural vehicle includes a steering control system configured to operate the steering input device. The steering control system includes processing circuitry. The processing circuitry is configured to receive a steering input indicating a curvature to be performed by the agricultural vehicle. The processing circuitry is configured to operate the steering input device using a primary curvature model of the agricultural vehicle and the steering input. The primary curvature model of the agricultural vehicle is configured to predict a steering condition of the steering input device to perform the steering input. The primary curvature model comprising a non-linear relationship between curvatures and steering conditions of the steering input device.

20 Claims, 7 Drawing Sheets

(56) References Cited

U.S. PATENT DOCUMENTS

| | | | |
|---|---|---|---|
| 2023/0135242 A1* | 5/2023 | Ito | B60W 30/0953 |
| | | | 701/25 |
| 2023/0174099 A1* | 6/2023 | Johnson | B60W 60/0013 |
| | | | 701/25 |
| 2025/0089593 A1* | 3/2025 | McGregor | G05D 1/646 |
| 2025/0089594 A1* | 3/2025 | McGregor | G05D 1/0212 |
| 2025/0091566 A1* | 3/2025 | McGregor | B60W 10/20 |

* cited by examiner

500 ⤵

502
Receive a steering input indicating a curvature to be performed by the agricultural vehicle

↓

504
Operate the steering input device using a primary curvature model of the agricultural vehicle and the steering input device

602
Obtain steering condition data corresponding to the steering conditions of the steering input device

↓

604
Obtain curvature data corresponding to the curvatures of the agricultural vehicle

↓

606
Use the steering condition data and the curvature data to obtain a primary curvature model that predicts steering condition data given commanded curvature data

↓

608
Determine that the primary curvature model has converged

↓

610
Operate the steering input device using the primary curvature model and a given commanded curvature

FIG. 6

AUTOMATIC ENCODER CALIBRATION SYSTEM FOR AN AGRICULTURAL VEHICLE

BACKGROUND

The present disclosure relates generally to an agricultural vehicle. More specifically, the present disclosure relates to a steering control system for agricultural vehicles.

SUMMARY

One implementation of the present disclosure is an agricultural vehicle, according to some embodiments. In some embodiments, the agricultural vehicle includes a steering input device configured to steer the agricultural vehicle to perform a turn. In some embodiments, the agricultural vehicle includes a steering control system configured to operate the steering input device. In some embodiments, the steering control system include processing circuitry. In some embodiments, the processing circuitry is configured to receive a steering input indicating a curvature to be performed by the agricultural vehicle. In some embodiments, the processing circuitry is configured to operate the steering input device using a primary curvature model of the agricultural vehicle and the steering input. In some embodiments, the primary curvature model of the agricultural vehicle is configured to predict a steering condition of the steering input device to perform the steering input. In some embodiments, the primary curvature model includes a non-linear relationship between curvatures and steering conditions of the steering input device In some embodiments, the primary curvature model is generated following the step of obtaining steering condition data corresponding to the steering conditions of the steering input device. In some embodiments, the primary curvature model is generated following the step of obtaining curvature data corresponding to the curvatures of the agricultural vehicle. In some embodiments, the primary curvature model is generated following the step of using the steering condition data and the curvature data to obtain the primary curvature model that predicts steering condition data given commanded curvature data. In some embodiments, the primary curvature model is generated following the step of determining that the primary curvature model has converged. In some embodiments, the primary curvature model is generated following the step of operating the steering input device using the primary curvature model and a given commanded curvature. In some embodiments, the primary curvature model is a third-degree polynomial function.

In some embodiments, a calibration curvature model is generated following the step of operating the steering input device of the agricultural vehicle for the given commanded curvature using the primary curvature model. In some embodiments, the calibration curvature model is generated following the step of obtaining the steering condition data of the steering input device and the curvature data of the agricultural vehicle. In some embodiments, the calibration curvature model is generated following the step of using the steering condition data and the curvature data to obtain the calibration curvature model that predicts the steering condition data given the commanded curvature data.

In some embodiments, the processing circuitry may adjust a calibration constant of the calibration curvature model. In some embodiments, the processing circuitry is configured to determine if the steering condition is within a center range. In some embodiments, the processing circuitry is configured to adjust a constant of the primary curvature model to correspond to the calibration constant of the calibration curvature model if the steering condition is within the center range.

In some embodiments, the processing circuitry is configured to determine if a deviation between the primary curvature model and the calibration curvature model exceeds a threshold. In some embodiments, the processing circuitry is configured to perform at least one of generating an alert or stop operating the steering input device using the primary curvature model of the agricultural vehicle and the steering if the deviation is above the threshold. In some embodiments, the steering control system is a retrofit system that may be installed to control the steering input device of the agricultural vehicle.

Another implementation of the present disclosure is a steering control system configured to operate a steering input device of an agricultural vehicle to perform a turn, according to some embodiments. In some embodiments, the steering control system includes processing circuitry. In some embodiments, the processing circuitry is configured to receive a steering input indicating a curvature to be performed by the agricultural vehicle. In some embodiments, the processing circuitry is configured to operate the steering input device using a primary curvature model of the agricultural vehicle and the steering input. In some embodiments, the primary curvature model of the agricultural vehicle is configured to predict a steering condition of the steering input device to perform the steering input.

In some embodiments, the primary curvature model of the agricultural vehicle is configured to predict a steering condition of the steering input device to perform the steering input.

In some embodiments, the primary curvature model is generated following the step of obtaining steering condition data corresponding to the steering conditions of the steering input device. In some embodiments, the primary curvature model is generated following the step of obtaining curvature data corresponding to the curvatures of the agricultural vehicle. In some embodiments, the primary curvature model is generated following the step of using the steering condition data and the curvature data to obtain the primary curvature model that predicts steering condition data given commanded curvature data. In some embodiments, the primary curvature model is generated following the step of determining that the primary curvature model has converged. In some embodiments, the primary curvature model is generated following the step of operating the steering input device using the primary curvature model and a given commanded curvature. In some embodiments, the primary curvature model is a third-degree polynomial function.

In some embodiments, a calibration curvature model is generated following the step of operating the steering input device of the agricultural vehicle for the given commanded curvature using the primary curvature model. In some embodiments, the calibration curvature model is generated following the step of obtaining the steering condition data of the steering input device and the curvature data of the agricultural vehicle. In some embodiments, the calibration curvature model is generated following the step of using the steering condition data and the curvature data to obtain the calibration curvature model that predicts the steering condition data given the commanded curvature data.

In some embodiments, the processing circuitry may adjust a calibration constant of the calibration curvature model. In some embodiments, the processing circuitry is configured to determine if the steering condition is within a center range. In some embodiments, the processing circuitry is configured to adjust a constant of the primary curvature model to correspond to the calibration constant of the calibration curvature model if the steering condition is within the center range.

In some embodiments, the processing circuitry is configured to determine if a deviation between the primary curvature model and the calibration curvature model exceeds a threshold. In some embodiments, the processing circuitry is configured to perform at least one of generating an alert or stop operating the steering input device using the primary curvature model of the agricultural vehicle and the steering if the deviation is above the threshold. In some embodiments, the steering control system is a retrofit system that may be installed to control the steering input device of the agricultural vehicle.

Another implementation of the present disclosure is a method for controlling a steering control system of an agricultural vehicle, according to some embodiments. In some embodiments, the method includes receiving a steering input indicating a curvature to be performed by the agricultural vehicle. In some embodiments, the method includes operating a steering input device of the agricultural vehicle using a primary curvature model of the agricultural vehicle and the steering input. In some embodiments, the primary curvature model of the agricultural vehicle is configured to predict a steering condition of the steering input device to perform the steering input. In some embodiments, the primary curvature model including a non-linear relationship between curvatures and steering conditions of the steering input device.

In some embodiments, the primary curvature model is generated following the step of obtaining steering condition data corresponding to the steering conditions of the steering input device. In some embodiments, the primary curvature model is generated following the step of obtaining curvature data corresponding to the curvatures of the agricultural vehicle. In some embodiments, the primary curvature model is generated following the step of using the steering condition data and the curvature data to obtain the primary curvature model that predicts steering condition data given commanded curvature data. In some embodiments, the primary curvature model is generated following the step of determining that the primary curvature model has converged. In some embodiments, the primary curvature model is generated following the step of operating the steering input device using the primary curvature model and a given commanded curvature. In some embodiments, the primary curvature model is a third-degree polynomial function.

In some embodiments, a calibration curvature model is generated following the step of operating the steering input device of the agricultural vehicle for the given commanded curvature using the primary curvature model. In some embodiments, the calibration curvature model is generated following the step of obtaining the steering condition data of the steering input device and the curvature data of the agricultural vehicle. In some embodiments, the calibration curvature model is generated following the step of using the steering condition data and the curvature data to obtain the calibration curvature model that predicts the steering condition data given the commanded curvature data.

In some embodiments, the method includes determining if a deviation between the primary curvature model and the calibration curvature model exceeds a threshold. In some embodiments, the method includes performing at least one of generating an alert or stop operating the steering input device using the primary curvature model of the agricultural vehicle and the steering if the deviation is above the threshold. In some embodiments, the method includes determining if the steering condition is within a center range. In some embodiments, the method incudes adjusting a constant of the primary curvature model to correspond to a calibration constant of the calibration curvature model if the steering condition is within the center range.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 5 is a flow diagram of a process for adjusting a steering input device of the vehicle of FIG. 1, according to an exemplary embodiment.

FIG. 6 is a flow diagram of a process for obtaining a primary curvature model of the vehicle of FIG. 1, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
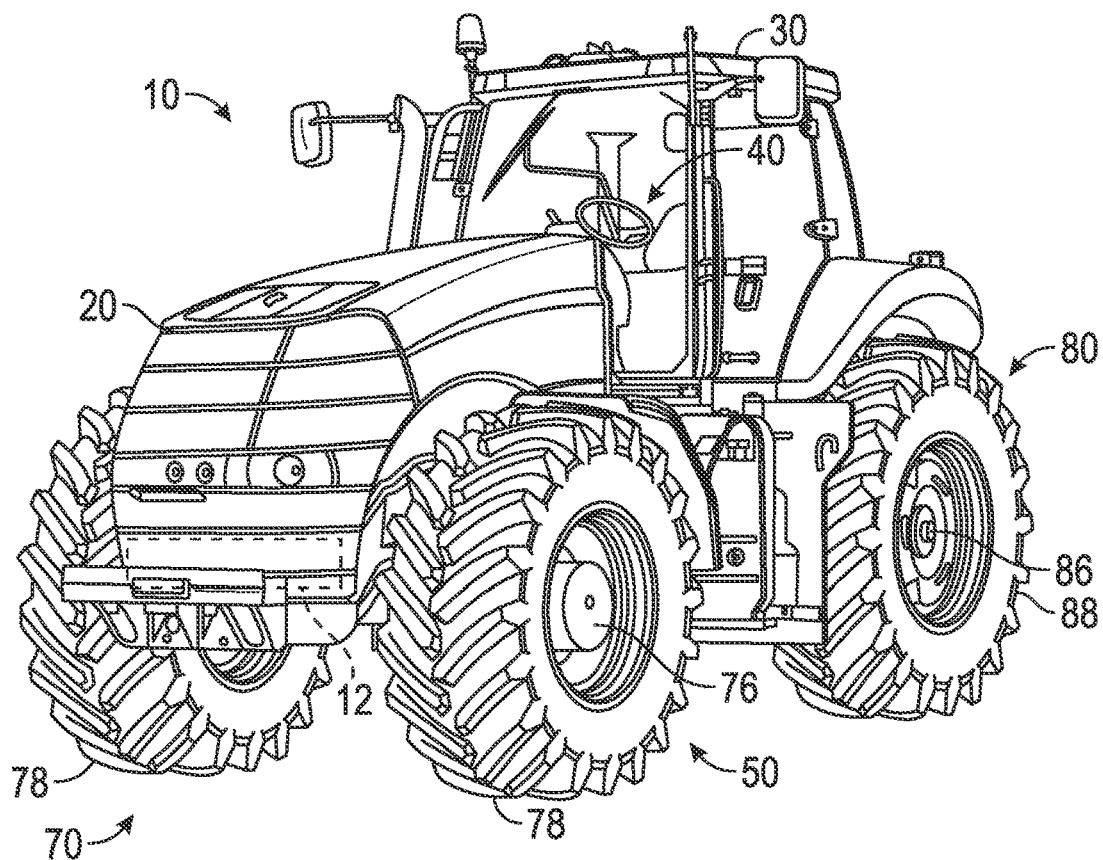
FIG. 1 is a perspective view of a vehicle, according to an exemplary embodiment.
Figure 2:
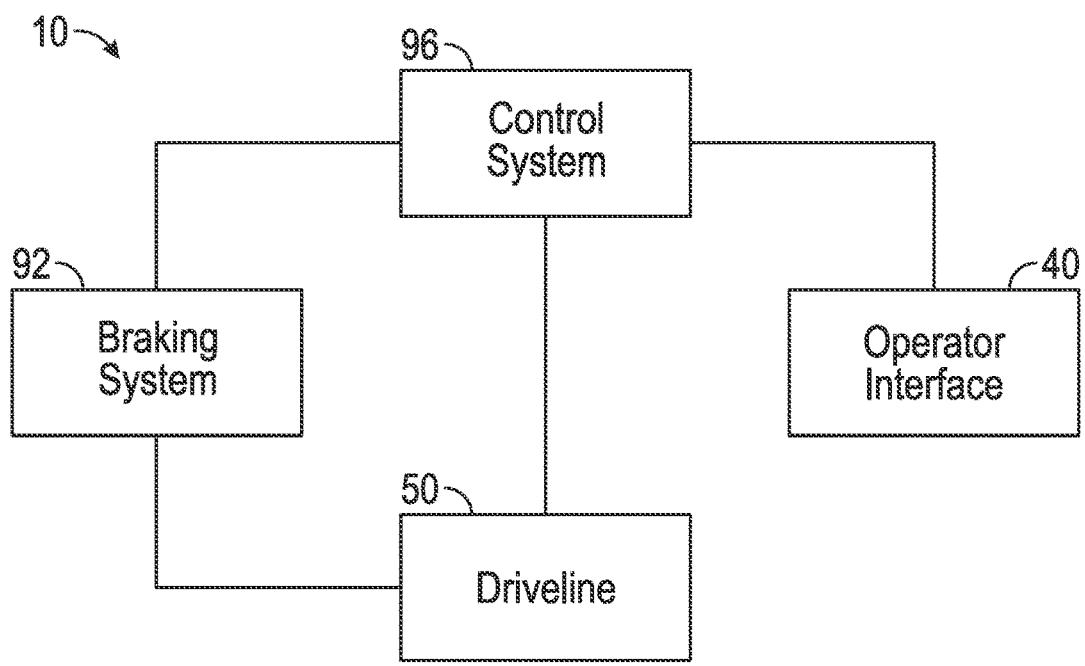
FIG. 2 is a schematic block diagram of the vehicle of FIG. 1, according to an exemplary embodiment.
Figure 3:
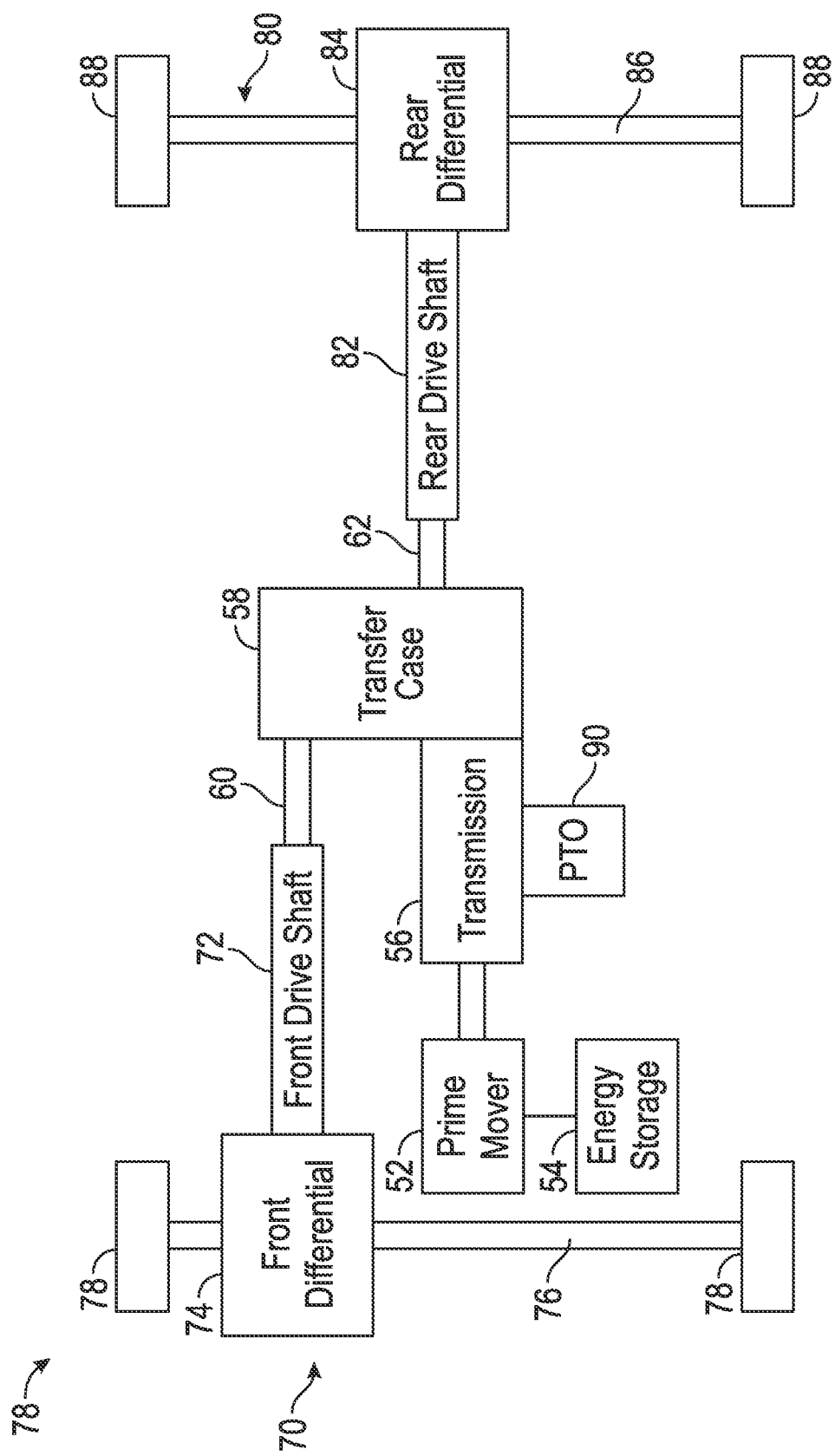
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes an implement system which may include one or more attached implements and/or trailed implements as such as a front mounted mower, a rear mounted mower, a trailed mower, a tedder, a rake, a baler, a plough, a cultivator, a rotavator, a tiller, a harvester, and/or another type of attached implement or trailed implement. The implements of implement system may couple to the front or rear of vehicle 10 through various means, including, but not limited to, hydraulic hoses, electrical wires, PTO connection, three-point hitch, ball hitch, front forks, etc.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, an LCD display, an LED display, a speedometer, gauges, warning lights, etc. The one or more input device may be or include a steering wheel, a joystick, buttons, switches, knobs, levers, an accelerator pedal, an accelerator lever, a plurality of brake pedals, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, a mechanical front-wheel drive, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle). In some embodiments, the driveline includes a mechanical front-wheel drive assembly ("MFWD") in which the prime mover 52 is mechanically coupled to an axle disposed between the front tractive elements 78. A mechanical front-wheel drive assembly may be used when the vehicle has rear tractive element 88 of a different size than the front tractive elements 78.

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Encoder Automatic Calibration System

Steering System

Figure 4:
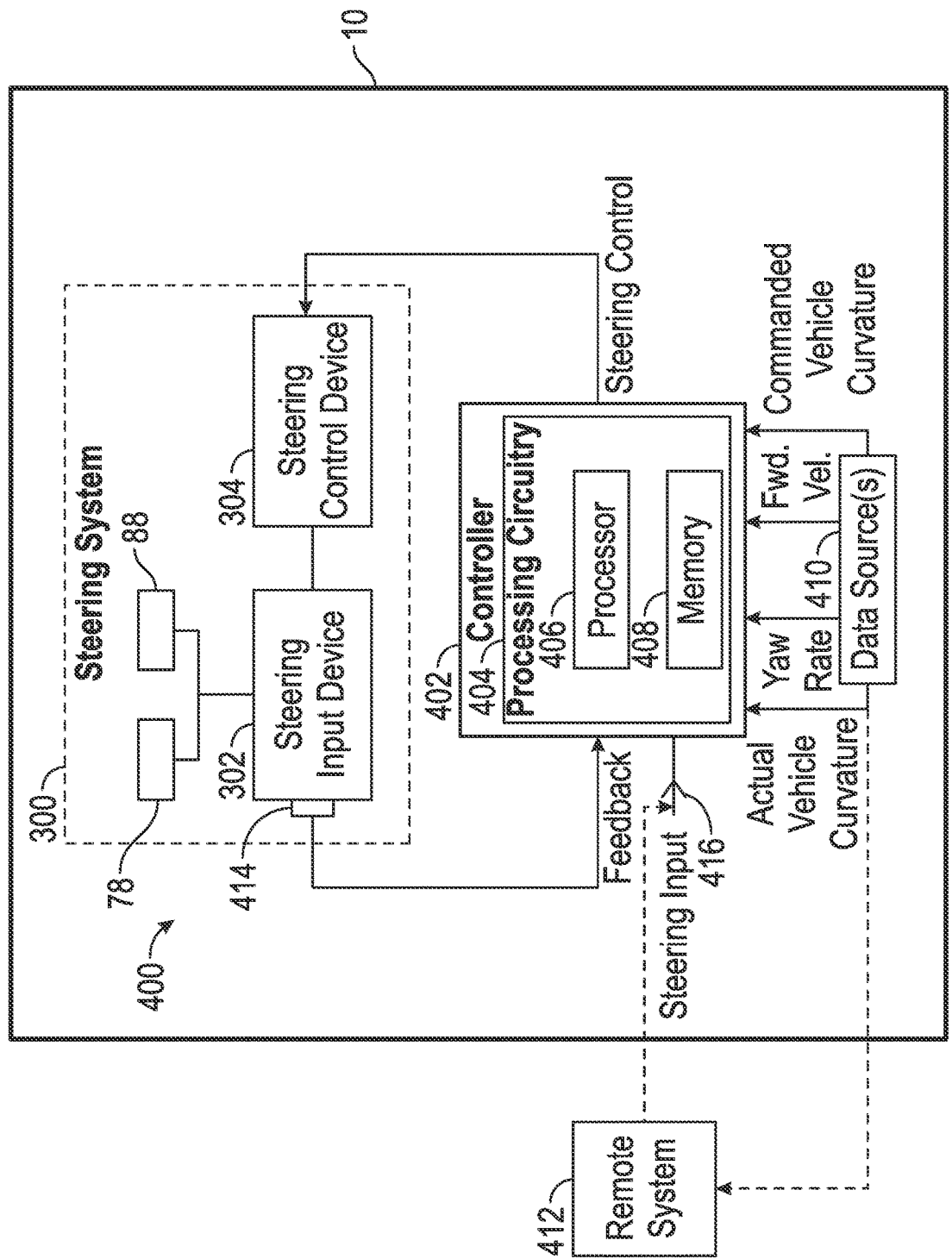
FIG. 4 is a block diagram of a control system for controlling steering of the vehicle of FIG. 1, according to an exemplary embodiment.
Figure 8:
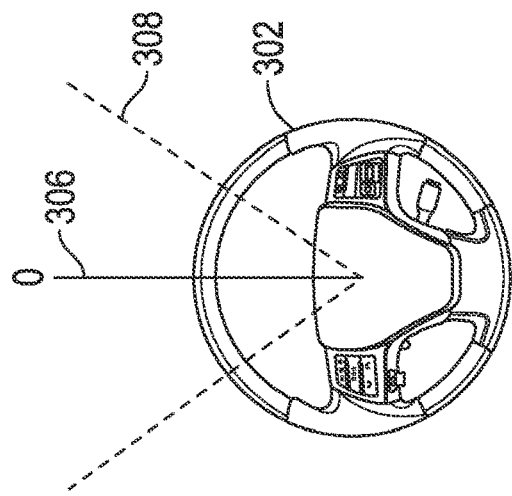
FIG. 8 is a front view of a steering input device of the vehicle of FIG. 1 in a center position, according to an exemplary embodiment.

Referring to FIG. 4, the vehicle 10 may include a steering control system 400 for a steering system 300. The steering system 300 is operable to adjust an orientation of one or more pairs of tractive elements (e.g., tractive elements 78, tractive elements 88, etc.). In some embodiments, the steering system 300 is configured to adjust an orientation of the tractive elements 78 to perform a turn of the vehicle 10. The steering system 300 may include a steering input device 302 (e.g., a steering wheel, a rotatable control device, a steering device, a steering input device, a joystick, etc.) and a steering control device 304 (e.g., a steering control system, etc.). Referring to FIG. 8, a steering condition 306 (e.g., an angle of the steering wheel, a position of the steering input device, etc.) of the steering input device 302 may be adjusted in order to adjust the orientation of the one or more pairs of tractive elements to complete the turn. The steering input device 302 may be operable coupled with one or more steering components such as hydraulic components, rack and pinions, etc., in order to turn one or more of the tractive elements 78 or the tractive elements 88 to steer the vehicle 10. The steering control device 304 may include hydraulic actuators (e.g., a rack and pinion system), linear electric actuators, pneumatic actuators, hydraulic motors, etc., configured to use a steering control to adjust the steering condition 306 of the steering input device 302 in order to adjust the orientation of the one or more pairs of tractive elements to perform the turn. In some embodiments, the steering control device 304 is an electric motor or electric transducer configured to receive the steering control and adjust the steering condition 306 of the steering input device 302 in order to adjust the orientation of the one or more pairs of tractive elements. The steering control device 304 may be operably coupled with the steering input device 302 such that the steering control device 304 implements the steering control to adjust the steering condition 306 of the steering input device 302 by adjusting an orientation, an angle, a position, etc., of the steering input device 302.

In some embodiments, a relationship between adjusting the steering condition 306 of the steering input device 302 and adjusting the orientation of the one or more of the tractive elements 78 or the tractive elements 88 to steer the vehicle 10 may be non-linear (e.g., the adjustment of the one or more of the tractive elements 78 or the tractive elements 88 is not proportional to the adjustment of the steering condition 306 of the steering input device 302, etc.). For example, as the steering condition 306 of the steering input device 302 is adjusted further away from a center steering position (e.g., a position of the steering input device 302 that results in the vehicle 10 driving straight, etc.), the tractive elements 78 may turn at a decreasing rate.

Figure 9:
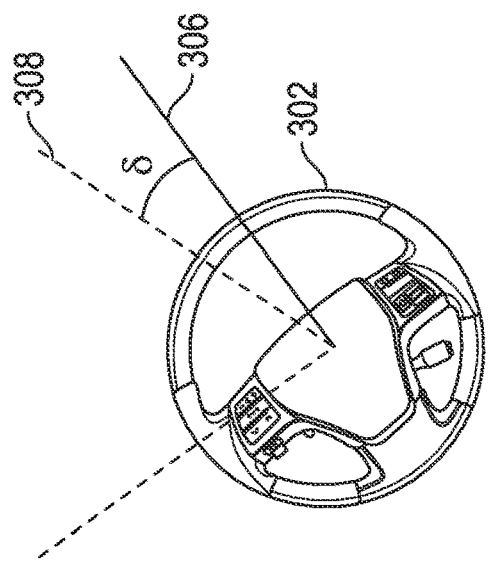
FIG. 9 is a front view of the steering input device of FIG. 8 in an oversteer position, according to an exemplary embodiment.

In some embodiments, the steering condition 306 of the steering input device 302 may be adjusted outside of an operational range that corresponds with a maximum orientation of the one or more of the tractive elements 78 or the tractive elements 88 to steer the vehicle 10, such that the steering condition 306 of the steering input device 302 may be adjusted without adjusting the orientation of the one or more of the tractive elements 78 or the tractive elements 88. For example, the steering condition 306 of the steering input device 302 could continue to be adjusted away from the center steering position in a direction after the tractive elements 78 have reached a maximum orientation and the orientation of the tractive elements 78 can no longer be adjusted any further in the direction. For example, referring to FIG. 8, the steering condition 306 of the steering input device 302 may be positioned in a center condition that corresponds to the vehicle 10 traveling straight forward. The steering input device 302 may include an operational band 308 (e.g., a center range, etc.) that corresponds with a range that the steering condition 306 may be adjusted that results in the adjustment in the orientation of the one or more of the tractive elements 78 or the tractive elements 88 to steer the vehicle 10. In some embodiments, the adjustment of the steering condition 306 outside of the operational band 308 will not result in any adjustment of the orientation of the one or more of the tractive elements 78 or the tractive elements 88. For example, referring to FIG. 9, when the steering condition 306 is outside of the operational band 308, any adjustment of the steering condition 306 that remains outside of the operational band 308 will not result in any adjustment of the orientation of the one or more of the tractive elements 78 or the tractive elements 88. In some embodiments, the adjustments of the steering condition 306 of the steering input device 302 beyond the operational band 308 may be measured with an angle δ. For example, referring to FIG. 9, the steering condition 306 may be adjusted outside of the operational band 308 by the angle δ.

Figure 11:
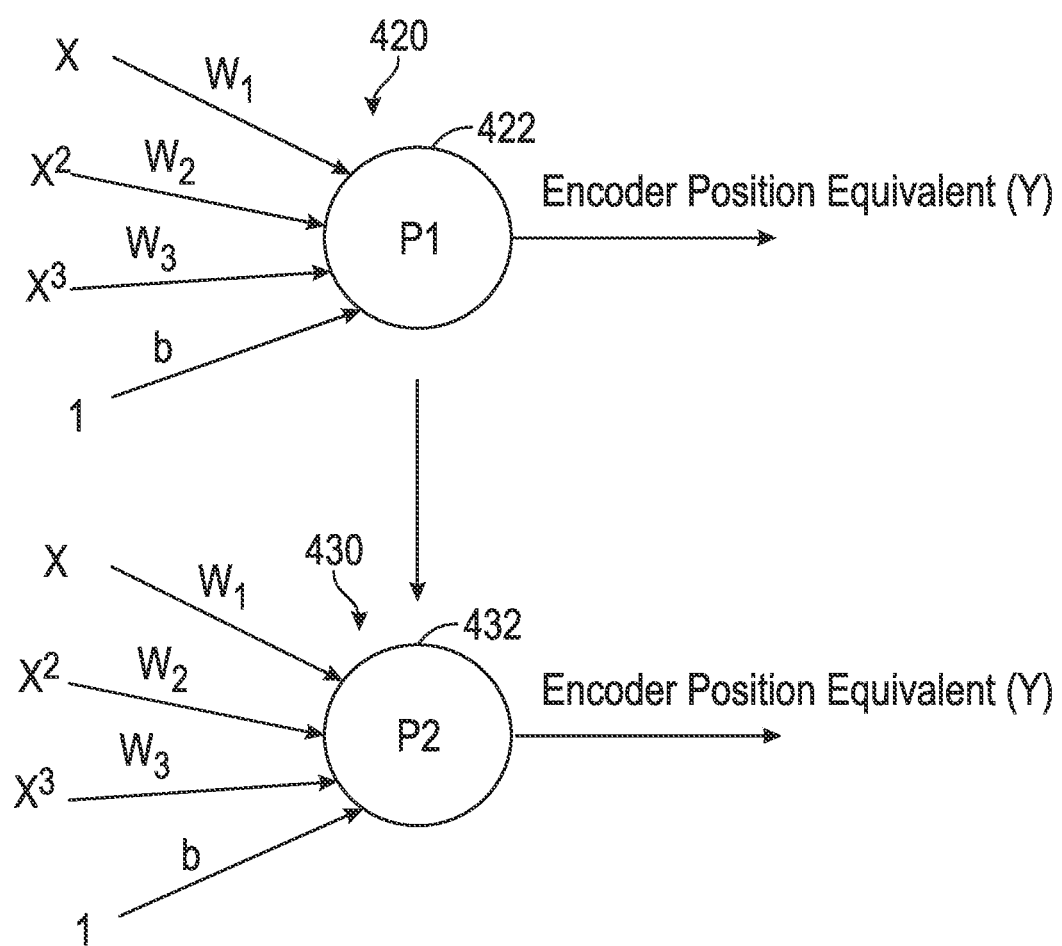
FIG. 11 is a block diagram of a primary curvature model and a calibration curvature model of the vehicle of FIG. 1, according to an exemplary embodiment.

The steering system 300 is operable by a controller 402 of the steering control system 400, according to some embodiments. In some embodiments, the controller 402 is configured to receive a steering input 416 from a remote system 412 (e.g., a remote operating system, etc.) or an operator and provide the steering control to the steering control device 304. The steering input 416 indicates at least one of a desired degree, a desired radius, or a desired rate of turn, or may indicate a commanded curvature of the vehicle 10. In some embodiments, the steering input 416 corresponds to a turn that the vehicle should perform. In some embodiments, the controller 402 may receive sensor inputs from a sensor that corresponds with the steering input device 302. In some embodiments, the sensor inputs may be encoder values (e.g., encoder position, encoder feedback, encoder signals, etc.) from an encoder 414 that is configured to detect a position, rate of change, etc., of the steering input device 302. In some embodiments, the encoder 414 is a sensor that is provided as a component of the steering control device 304. The controller 402 is configured to use the steering input 416 to determine and output the steering control to the steering control device 304. In some embodiments, referring to FIG. 11, the controller 402 is configured to autonomously operate the steering system 300 using a primary curvature model 420 and the steering input 416 that relates the steering input 416 to the steering condition 306 of the steering input device 302 that would result in the vehicle 10 performing a route corresponding to a path of the steering input 416, and then providing the steering control to the steering control device 304 that will adjust the steering input device 302 to the steering condition 306. For example, when an operator or operating system provides the steering input 416 corresponding to a commanded curvature to the controller 402, the controller 402 determines a steering control corresponding to the steering condition 306 of the steering input device 302 that results in the vehicle 10 performing a turn corresponding to the commanded curvature using the primary curvature model 420 to relate the commanded curvature to the steering condition 306. In some embodiments, one or more components of the steering system 300 are retrofit or "pin-on" components (e.g., a retrofit system, etc.) for existing steering system architecture. For example, the encoder 414 and the steering control device 304 may be retrofit components on the steering input device 302 in order to enable autonomous or remote steering of the vehicle 10 (in addition to other components to control driveline operations remotely). The controller 402 is configured to generate the primary curvature model 420 relating the steering input 416 to the steering condition 306 of the steering input device 302, in some embodiments. For example, in some embodiments, the controller 402 takes a machine learning approach to generate the primary curvature model 420 between the commanded curvature and an encoder value of the encoder 414 by obtaining the encoder values of the encoder 414, obtaining actual curvatures of the vehicle corresponding to the path that is taken by the vehicle 10, performing a regression based on the encoder values and the actual curvatures to obtain the primary curvature model 420 that determines the encoder values of the encoder 414 that correspond with the commanded curvatures, and then activating the primary curvature model 420 so that the primary curvature model 420 may be used to translate the command curvatures into the encoder values of the encoder 414. In some embodiments, the primary curvature model 420 may be used by the controller 402 to determine steering controls of the steering control device 304 based on the steering inputs 416, as described above. Further, different agricultural vehicles may have different of the steering systems 300 which can have different primary curvature models relating the steering input 416 to the steering control device 304. Advantageously, the controller 402 is configured to generate the primary curvature models between the steering inputs 416 and steering controls for the agricultural vehicles to enhance autonomous control of the steering system 300. In some embodiments, referring to FIG. 11, the controller 402 is configured to generate a calibration curvature model 430 relating the steering input 416 to the steering condition 306 of the steering input device 302. In some embodiments, the controller 402 may continue to generate the calibration curvature model 430 while the controller 402 is operating the steering input device 302 using the primary curvature model 420 and the steering input 416.

Figure 10:
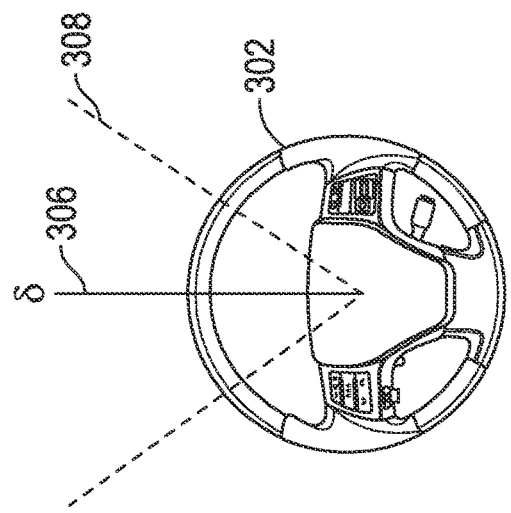
FIG. 10 is a front view of the steering input device of FIG. 8 in a returned center position, according to an exemplary embodiment.

In some embodiments, the encoder 414 may continue to generate encoder values corresponding to the steering condition 306 of the steering input device 302 when the steering condition 306 is adjusted outside of the operational band 308. For example, referring to FIG. 9, the encoder may generate the encoder value that is an angle of the steering input device 302 outside of the operational band 308 by the angle δ. When the angle of the steering input device 302 is outside of the operational band 308 by the angle δ, an error may develop in the primary curvature model 420 as the controller 402 uses the primary curvature model 420 and the steering input 416 to operate the steering input device 302. In some embodiments, the error may result from a difference between the angle generated by the encoder 414 and the orientation of the tractive elements of the vehicle 10 due to the angle generated by the encoder 414 continuing to adjust when the steering condition 306 is outside of the operational band 308 while the orientation of the tractive elements of the vehicle 10 does not continue to adjust when the steering condition 306 is outside of the operational band 308. For example, referring to FIG. 10, if the steering condition 306 is adjusted outside of the operational band 308 by the angle δ and returned to the center condition, the error developed by the primary curvature model 420 may correspond to the angle δ. In some embodiments, the primary curvature model 420 may be adjusted to eliminate the error resulting from the steering condition 306 of the steering input device 302 being adjusted outside of the operational band 308. The controller 402 may also be configured to obtain various sensor data from one or more data source(s) 410 including the actual curvature of the vehicle 10, yaw rate of the vehicle 10, forward velocity of the vehicle 10, and the commanded curvature of the vehicle 10. In some embodiments, the steering input 416 includes the commanded curvature. In some embodiments, the data source(s) 410 include various sensors, systems, subsystems, Global Positioning System (GPS), etc., of the vehicle 10. In particular, the GPS of the data sources 410 of the vehicle 10 may obtain the actual curvature and provide the actual curvature to the controller 402 and the remote system 412.

Referring still to FIG. 4, the controller 402 includes a circuit, shown as processing circuitry 404, a processor, shown as processor 406, and memory, shown as memory 408, according to an exemplary embodiment. Controller 402 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, controller 402 includes the processing circuitry 404 and memory 408. Processing circuitry 404 may include an ASIC, one or more FPGAs, a DSP, circuits containing one or more processing components, circuitry for supporting a microprocessor, a group of processing components, or other suitable electronic processing components. In some embodiments, processing circuitry 404 is configured to execute computer code stored in memory 408 to facilitate the activities described herein. Memory 408 may be any volatile or non-volatile computer-readable storage medium capable of storing data or computer code relating to the activities described herein. According to an exemplary embodiment, memory 408 includes computer code modules (e.g., executable code, object code, source code, script code, machine code, etc.) configured for execution by processing circuitry 404. In some embodiments, controller 402 may represent a collection of processing devices (e.g., servers, data centers, etc.). In such cases, processing circuitry 404 represents the collective processors of the devices, and memory 408 represents the collective storage devices of the devices.

It should be understood that any of the functionality, model generation techniques, regression techniques, autonomous controls, model training techniques, controls, etc., of the controller 402 as described herein with reference to FIGS. 4-9 may be performed by the remote system 412. The remote system 412 may be similar to the controller 402 including processing circuitry, processors, memory, etc. In some embodiments, the remote system 412 and the controller 402 are communicably coupled with each other via a telematics unit (e.g., a transceiver, a wireless transmitter, a radio, a cellular dongle, etc.) of the vehicle 10. In some embodiments, the steering input device 302 is operably coupled via components of the steering system 300 similar to or the same as described in U.S. application Ser. No. 17/404,878, filed Aug. 17, 2021, the entire disclosure of which is incorporated by reference herein.

Referring to FIG. 5, a flow diagram of a process 500 for operating a steering input device of an agricultural vehicle includes steps 502-504, according to some embodiments. In some embodiments, the process 500 is performed by the controller 402 based on data obtained from one or more data sources 410 (shown in FIG. 4) of the vehicle 10 and the primary curvature model 420. In some embodiments, the data sources 410 as shown in FIG. 4 include sensors, systems, sub-systems, etc., of the vehicle 10.

The process 500 includes receiving a steering input (e.g., a first input, a commanded input, a turn request, etc.) indicating a curvature to be performed by a vehicle (step 502), according to some embodiments. In some embodiments, step 502 is performed by the controller 402 by receiving the steering input 416 from an operator, the remote system 412, or another control system. In some embodiments, the curvature is a turn radius for the vehicle. In some embodiments, the curvature is a path that includes multiple turn radii for the agricultural vehicle. For example, the curvature may be a 180 degree turn to change the direction of the agricultural vehicle.

The process 500 includes operating the steering input device using a primary curvature model of the agricultural vehicle and the steering input (step 504), according to some embodiments. For example, an electric motor coupled to a steering wheel may receive a steering control to rotate the steering wheel to a steering condition that would result in the agricultural vehicle performing the turn corresponding to the curvature of the steering input. The electric motor may then rotate the steering wheel to the steering condition that results in the agricultural vehicle performing the turn corresponding to the curvature of the steering input. In some embodiments, step 504 is performed by the controller 402 and includes operating the steering input device 302 using the steering control device 304 based on the steering control.

In some embodiments, the operation of the steering input device at step 504 includes feedback from encoder values of the encoder. For example, an electric motor coupled to a steering wheel may receive a steering control associated with a prescribed encoder value of the encoder that would result in the agricultural vehicle performing the turn corresponding to the curvature of the steering input. The electric motor may then rotate the steering wheel until the encoder provides an encoder value that corresponds to the prescribed encoder value. In some embodiments, the operation of the steering input device may be a closed-loop control system that includes feedback from the encoder.

In some embodiments, step 504 is performed by the controller 402 and includes modeling the steering input 416 with the primary curvature model 420 to generate the steering condition 306 of the steering input device 302 that results in the vehicle 10 performing a turn that corresponds to the curvature of the steering input 416. For example, the controller 402 may model the steering input 416 including a turn with the primary curvature model to determine an angle of a steering wheel that will result in the vehicle 10 completing the turn. The controller 402 may then provide a steering control to the steering control device 304 that will adjust the steering wheel so that the steering wheel is at the angle that will result in the vehicle 10 completing the turn. In some embodiments, the primary curvature model includes a non-linear relationship between the steering input and adjustment of the steering condition. For example, tractive elements of the agricultural vehicle may turn at a decreasing rate relative to the adjustment of the steering condition 306 of the steering input device 302 as the steering condition 306 of the steering input device 302 is adjusted away from a center position.

In some embodiments, the steering control generated at step 504 corresponds to encoder values of an encoder configured to detect a position, rate of change, etc., of the steering input device. For example, the steering control may correspond to adjusting the steering input device until the encoder detects a control position of the steering input device. In some embodiments, the encoder may be retrofit components on the steering input device. In some embodiments, the encoder values correspond to the encoder 414 configured to detect a position, rate of change, etc., of the steering input device 302.

Primary Curvature Model Generation

Referring to FIGS. 4 and 6, the controller 402 may be configured to perform a primary curvature model generation process in order to generate and train a primary curvature model of the steering system 300 for use in control of the steering system 300. In some embodiments, the primary curvature model of the steering system 300 may be generated and trained by being provided with steering conditions of to the steering system 300 and curvatures of the vehicle. In some embodiments, the primary curvature model of the steering system 300 is obtained by performing a recursive regression technique in order to identify a polynomial function that achieves a best correlation (e.g., lowest error) between curvatures of a vehicle and estimated curvatures generated by the curvature model.

Referring to FIG. 6, a flow diagram of a process 600 for obtaining a primary curvature model includes steps 602-610, according to some embodiments. In some embodiments, the process 600 is performed by the controller 402 based on data obtained from one or more data sources 410 (shown in FIG. 4) of the vehicle 10 to obtain the primary curvature model 420. In some embodiments, the process 600 is performed through a perceptron (e.g., a neural net, a feedforward neural net, a linear neural net, etc.) In some embodiments, the data sources 410 as shown in FIG. 4 include sensors, systems, sub-systems, etc., of the vehicle 10.

The process 600 includes obtaining steering condition data corresponding to the steering conditions of the steering input device (step 602), according to some embodiments. In some embodiments, the steering condition data relates to the steering condition of the steering input device of the agricultural vehicle. For example, the steering condition data may include angles of a steering wheel of the steering system of the agricultural vehicle, positions of the steering input device, etc. In some embodiments, step 602 is performed by the controller 402 by obtaining the steering condition data over a time period (e.g., a learning time period). In some embodiments the steering condition data includes the encoder values of the encoder 414 of the steering system 300. For example, the steering condition data may include encoder values of the encoder 414 that correspond with the steering condition 306 of the steering input device 302.

In some embodiments, step 602 may occur during normal operation of the agricultural vehicle (e.g., while the agricultural vehicle is performing a function, operation of the agricultural vehicle outside of a controlled environment, etc.). During normal operation of the agricultural vehicle, an operator may manually adjust a steering condition of a steering input device to adjust an orientation of one or more pairs of tractive elements, resulting in a turn of the agricultural vehicle. For example, the steering condition data of the steering input device may be obtained while an operator is manually controlling the steering input device to operate the agricultural vehicle to perform a function such as plowing a field, baling hay, etc.

In some embodiments, the steering condition data is batched to only include extreme steering conditions (e.g., maximum steering conditions, minimum steering conditions, etc.) and the remaining steering conditions are eliminated from the steering collection data. In some embodiments, the steering condition data is batched by the controller 402. For example, the controller 402 may receive steering conditions from the encoder 414. Due to memory size restrictions associated with the vehicle 10, the controller 402 may batch the extreme steering conditions into the steering collection data and eliminate the remaining steering conditions. The controller 402 may then continue to batch additional extreme steering conditions into the steering collection data over the time period without exceeding the memory size restrictions.

The process 600 includes obtaining curvature data corresponding to the curvatures of the vehicle (step 604), according to some embodiments. In some embodiments, the curvature data relates to actual curvatures of the vehicle (e.g., paths, turns of the vehicle, etc.). In some embodiments, step 604 is performed by the controller 402 by receiving an actual curvature taken by the vehicle 10 that results from the steering condition of the steering input device 302 over the time period. In some embodiments, the actual curvature is a GNSS curvature of the vehicle 10 obtained from a GPS of the vehicle 10. In some embodiments, similar to step 602, step 604 may occur during normal operation of the vehicle. In some embodiments, the curvature data is batched to only include extreme curvatures (e.g., maximum curvatures, minimum curvatures, etc.) and the remaining curvatures are eliminated from the curvature data, similar to the steering condition data obtained in step 602.

The process 600 includes using the steering condition data and the curvature data to obtain a primary curvature model that predicts steering condition data given commanded curvature data (step 606), according to some embodiments. In some embodiments, step 606 includes performing a regression (e.g., a first regression, etc.) based on the steering condition data of the steering input device and the curvature data of the vehicle to generate a primary curvature model of the vehicle. In some embodiments, step 606 includes feeding the steering condition data of the steering input device and the curvature data of the vehicle into a primary curvature perceptron to generate the primary curvature model as the primary curvature perceptron using machine learning techniques. For example, linear regression techniques may be used to create and train the primary curvature perceptron that predicts the steering condition data given the curvature data.

In some embodiments, step 606 includes comparing the primary curvature model to the curvature data to generate estimation errors. In some embodiments, the controller 402 may compare the curvature data of the vehicle 10 with the primary curvature model generated by the regression to generate estimation errors between the curvature data and the primary curvature model. In some embodiments, the regression includes adjusting the primary curvature model to reduce the estimation errors. In some embodiments, the primary curvature perceptron may train using the estimation errors to improve the primary curvature model.

In some embodiments, the primary curvature model is a primary polynomial function that predicts the steering condition data of the steering input device associated with the commanded curvature data. In some embodiments, referring to FIG. 11, the primary curvature model 420 is a primary polynomial function 422 that determines values of the steering conditions 306 of the steering input device 302 associated with curvatures. In some embodiments, the primary polynomial function is a third-order function (e.g., a third-degree polynomial function, a third-order polynomial equation, etc.). For example, for agricultural vehicles with non-linear relationships between adjusting the steering condition of the steering input device 302 and adjusting the orientation of the one or more of the tractive elements, a third-order function may more accurately model the relationship between the curvatures and the steering conditions. For example, the primary polynomial function may have the form $A_1x^3+B_1x^2+C_1x+D_1=y$, where x is the curvature of the agricultural vehicle, y is the steering condition, $A_1$ is a weight corresponding to $x^3$, $B_1$ is a weight corresponding to $x^2$, $C_1$ is a weight corresponding to x, and $D_1$ is a constant.

In some embodiments, the primary polynomial function may relate the curvatures of the agricultural vehicle to an encoder value associated with a steering input device. For example, the primary polynomial function may receive commanded curvature data and determine the encoder values of the encoder that that is required such that the agricultural vehicle turns according to the commanded curvature data. In some embodiments, the primary polynomial function may be generated by the controller 402 to relate the curvature of the vehicle 10 to the encoder value of the encoder 414 that corresponds to the steering input device 302. For example, the primary polynomial function may receive commanded curvature data for the vehicle 10 and determine steering condition data of the steering input device 302 that is required such that the vehicle 10 turns according to the commanded curvature data.

In some embodiments, an initial form of the primary polynomial function is generated by setting weights corresponding to variables of the primary polynomial function to random values, by setting the weights corresponding to variables of the primary polynomial function to small random values, or using other techniques of creating polynomial functions. For example, the primary polynomial function may have the form $Ax^3+Bx^2+Cx+D=y$ and the values of A, B, C, and D may be set equal to random values between −1 and 1 to form the initial form of the polynomial function, which provides a starting point for the regression of the polynomial function. In some embodiments, the regression adjusts the primary polynomial function by modifying the constant and the weights corresponding to the variables of the polynomial function. For example, the constant and the weights may be adjusted to reduce the estimation errors by following a method of gradient decent.

The process 600 includes determining that the primary curvature model has converged (step 608), according to some embodiments. In some embodiments, the primary curvature model is considered to have converged after the regression has run for a specified amount of time, after the estimation error is below a predetermined threshold, after the primary curvature model has stabilized, or through other methods of determining convergence for regressions. In some embodiments the predetermined threshold corresponding to the estimation error of the primary curvature model may be set by an operator, be determined by operating conditions, or be selected using a different method. In some embodiments, the predetermined threshold may include a value of the estimation errors, a trend in the estimation errors, the estimation errors holding below a value for a set number of iterations of the primary curvature model, or other methods of determining that the regression has converged based on estimation errors.

The process 600 includes operating a steering control system using the primary curvature model for a given commanded curvature (step 610), according to some embodiments. For example, a steering control system may receive curvature data that includes a commanded curvature for an agricultural vehicle to perform. The steering control system may predict steering condition data for the agricultural vehicle to follow the commanded curvature and operate a steering input device such that the agricultural vehicle performs a turn corresponding to the commanded curvature. In some embodiments, step 610 may be implemented by performing the process 500.

In some embodiments, the steering control system may be partially operated using the primary curvature model for the given command curvature and may partially rely on another means to operate the steering control system (e.g., an operator input, sensors data from the agricultural vehicle, etc.). In some embodiments, step 610 may include converting the commanded curvature into steering control data using the primary curvature model. In some embodiments, step 610 may include converting steering control data into encoder values and operating a steering control device to achieve the encoder values. For example, the controller 402 may convert the steering curvature data into an encoder value of the encoder 414 and then operate the steering control device 304 until the encoder generates the encoder value such that the vehicle 10 performs a turn associated with the commanded curvature. In some embodiments, the controller 402 may convert the steering curvature data into time-series data of positions of the encoder 414 and then operate the steering control device 304 so that the encoder 414 generates the time-series data of the positions of the encoder 414 such that the vehicle 10 performs a turn associated with the commanded curvature.

In some embodiments, step 610 may include activating the primary curvature model so that the primary curvature model may be used to operate the steering control system. In some embodiments, the primary curvature model may not be used by the vehicle to operate the steering control device of the agricultural vehicle according to the steering inputs until the primary curvature model has been activated. For example, the agricultural vehicle may not be operated by the steering control device receiving steering controls to adjust the steering condition of the steering input device until the primary curvature model has been activated. In some embodiments, step 610 is performed by the controller 402 by activating the primary curvature model for the steering system 300 such that the controller 402 may receive a commanded curvature and may autonomously turn the vehicle 10 to follow the commanded curvature. For example, the controller 402 may not utilize the primary curvature model to generate a steering condition of the steering input device 302 and an associated steering control for the steering control device 304 that results in the vehicle 10 performing a turn based on a commanded curvature until the primary curvature model has been activated.

Calibration Curvature Model Generation

Figure 7:
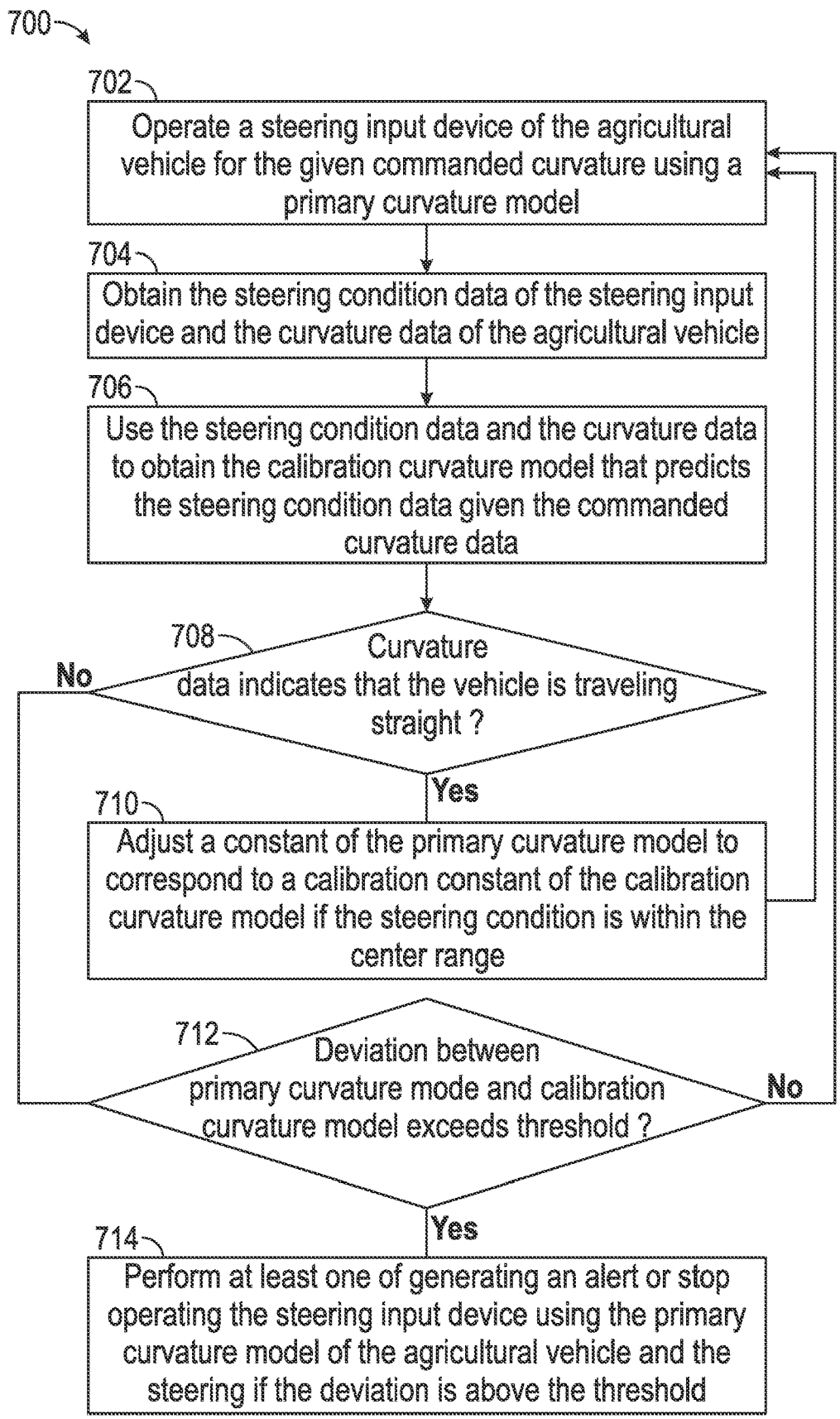
FIG. 7 is a flow diagram of a process for obtaining a calibration curvature model of the vehicle of FIG. 1, according to an exemplary embodiment.

Referring to FIGS. 4 and 7, the controller 402 may be configured to perform a calibration curvature model generation process in order to obtain a calibration curvature model (e.g., a training curvature model, an adjustment curvature model, etc.) of the steering system 300 for use in updating the primary curvature model of the steering system 300. In some embodiments, the calibration curvature model of the steering system 300 is obtained by performing a recursive regression technique in order to identify a polynomial function that achieves a best correlation (e.g., lowest error) between curvatures of a vehicle and estimated curvatures generated by the curvature model.

Referring to FIG. 7, a flow diagram of a process 700 for obtaining the calibration curvature model includes steps 702-714, according to some embodiments. In some embodiments, the process 700 is performed by the controller 402 based on data obtained from one or more data sources 410 (shown in FIG. 4) of the vehicle 10 to obtain the calibration curvature model 430. In some embodiments, the data sources 410 as shown in FIG. 4 include sensors, systems, sub-systems, etc., of the vehicle 10.

The process 700 includes operating a steering system of a vehicle for a given commanded curvature using a primary curvature model (step 702), according to some embodiments. In some embodiments, step 702 includes operating the steering system of the vehicle following process 500 using the primary curvature model obtained through process 600.

The process 700 includes obtaining steering condition data of steering input device and curvature data of curvatures of the vehicle (step 704) according to some embodiments. In some embodiments, the steering condition data relates to the steering condition of the steering input device of the agricultural vehicle, similar to the steering condition data obtained during step 602 of the process 600. In some embodiments, at least a portion of the steering condition data is generated while the steering system of the vehicle is operated for the given commanded curvature using the primary control model. For example, at least a portion of the steering control data of the steering input device may be obtained while the agricultural vehicle is being autonomously controlled using the primary curvature model. In some embodiments, the curvature data relates to the actual curvature of the vehicle, similar to the curvature data obtained during step 604 of the process 600 In some embodiments, step 704 is performed by the controller 402 by receiving an actual curvature taken by the vehicle 10 that results from the steering condition of the steering input device 302 over the time period. In some embodiments, the actual curvature is a GNSS curvature of the vehicle 10 obtained from a GPS of the vehicle 10. In some embodiments, similar to step 702, at least a portion of the curvature data is generated while the steering system of the vehicle is operated for the given commanded curvature using the primary control model.

The process 700 includes using the steering condition data and the curvature data to obtain a calibration curvature model that predicts steering condition data given commanded curvature data (step 706), according to some embodiments. In some embodiments, step 706 includes performing a regression (e.g., a second regression, etc.) based on the steering condition data of the steering input device and the curvature data of the vehicle to generate a calibration curvature model of the vehicle that determines values of a steering condition of the steering input device given a command curvature. In some embodiments, step 706 includes feeding the steering condition data of the steering input device and the curvature data of the vehicle into a calibration curvature perceptron to generate the calibration curvature model as the calibration curvature perceptron using machine learning techniques, similar to step 606 of the process 600. In some embodiments, an initial iteration of the calibration curvature model may be set as equivalent to the primary curvature model generated by process 600 after the primary curvature model has been activated. For example, an initial iteration of the calibration curvature model may be the same as (e.g., equivalent to, etc.) the primary curvature model determined to be converged in the process 600 such that the calibration curvature model may continue to improve off of the primary curvature model. In some embodiments, the regression may occur while the steering system is operating the steering input device of the agricultural vehicle to the steering condition according to the steering control generated by modeling the input with the primary curvature model obtained by process 600.

In some embodiments, the calibration curvature model is a calibration polynomial function that values of the steering condition of the steering input device associated with a curvature, similar to the primary curvature model generated by the process 600. In some embodiments, referring to FIG. 11, the calibration curvature model 430 is a calibration polynomial function 432 that determines values of the steering conditions 306 of the steering input device 302 associated with curvatures. In some embodiments, the calibration polynomial function is a third-order function, similar to the polynomial function generated by process 600. For example, the calibration polynomial function may have the form $A_2x^3+B_2x^2+C_2x+D_2=y$, where x is the curvature of the agricultural vehicle, y is the steering condition, $A_2$ is a weight corresponding to $x^3$, $B_2$ is a weight corresponding to $x^2$, $C_2$ is a weight corresponding to x, and $D_2$ is a constant. In some embodiments, the regression based on the steering condition data of the steering input device and the curvature data of the vehicle may only modify the constant term of the calibration polynomial. For example, the calibration polynomial function may have the form $A_2x^3+B_2x^2+C_2x+D_2=y$ and the regression may only modify $D_2$ based on the steering condition data of the steering input device and the curvature data of the vehicle.

The process 700 includes determining that the steering condition is within a center range (Step 708), according to some embodiments. In some embodiments, the center range may be an operational band of the steering input device where the agricultural vehicle is considered to be driving straight forward. In some embodiments, the center range may include the operational band of the steering input device where the agricultural vehicle is driving within an angle of driving straight forward (e.g., within 5 degrees of driving straight forward, within 2 degrees of driving straight forward, within 1 degree of driving straight forward, etc.).

The process 700 includes adjusting the primary curvature model based on the calibration curvature model and returning to step 702 if the steering condition is within the center range (Step 710), according to some embodiments. In some embodiments, the adjustment of the primary curvature model includes updating a constant of the primary curvature model to a calibration constant of the calibration curvature model if the steering condition is within the center range. For example, if the primary curvature model is the polynomial function with the form $A_1x^3+B_1x^2+C_1x+D_1=y$ and the calibration curvature model is the calibration polynomial function with the form $A_2x^3+B_2x^2+C_2x+D_2=y$, the value of $D_1$ may be updated to the value of $D_2$ when the steering condition is within the center range. By adjusting the primary curvature model based on the calibration curvature model when the steering condition is within the center range, the primary curvature model may be updated when the primary curvature model is not being modeled with an input to generate a steering control, as detailed in process 500.

The process 700 includes determining if a deviation between the calibration curvature model and the primary curvature model is above a threshold if the steering condition is not within the center range (Step 712), according to some embodiments. In some embodiments, the deviation may be a difference between the calibration curvature model and the primary curvature model that results in a different steering condition of the steering input device when a curvature is inputted into the calibration curvature model and the primary curvature model. In some embodiments, the threshold may be a value related to a maximum difference between the steering condition outputted by the calibration curvature model based on a curvature and the steering condition outputted by the primary curvature model based on the curvature. For example, the threshold may be a maximum difference between a first angle of a steering wheel outputted by the primary curvature model and a second angle of the steering wheel outputted by the calibration curvature model. In some embodiments, the determination that the deviation between the calibration curvature model and the primary curvature model is above the threshold may indicate that the primary curvature model is no longer accurate for the steering system of the vehicle and that the primary curvature model should be updated.

The process 700 includes performing at least one of generating an alert or deactivating the primary curvature model for the steering system if the deviation is above the threshold (Step 714), according to some embodiments. In some embodiments, the alert may include at least one of an audio or visual alert provided to an operator of the agricultural vehicle to indicate that the deviation between the calibration curvature model and the primary curvature model is above the threshold. For example, the alert may be provided to a display of the agricultural vehicle and may alert the operator that the steering control of the steering control device may no longer be accurate and needs to be updated. In some embodiments, the alert may indicate that the primary curvature model should be updated based on the calibration curvature model. In some embodiments, the deactivation of the primary curvature model may prevent the primary curvature model from being used by the steering system to operate the steering control device of the agricultural vehicle. In some embodiments, if the primary curvature model is being used by the steering system to operate the steering control device of the agricultural vehicle, the deactivation of the primary curvature model may result in stopping the operation of the steering control device. For example, if the primary curvature model is deactivated while being used to autonomously operate the steering input device, the autonomous operation may be stopped. In some embodiments, the deactivation of the primary curvature model may result in stopping the operation of the agricultural vehicle.

In some embodiments, the process 700 includes returning to step 702 if the deviation is not above the threshold, according to some embodiments. For example, if the deviation between the primary curvature model and the calibration curvature model is below the threshold, then the controller 402 will continue to operate the steering control device 304 for the commanded curvature data using the primary curvature model.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," or "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen, and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The terms "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, a code that creates an execution environment for the computer program in question (e.g., a code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing, and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media, and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 92, the control system 96, etc.) as shown in the various exemplary embodiments are illustrative only. Additionally, any element disclosed in one embodiment may be incorporated or utilized with any other embodiment disclosed herein.

What is claimed is:

1. An agricultural vehicle comprising:
a chassis;
a plurality of tractive elements coupled to the chassis;
a steering input device configured to steer at least one of the plurality of tractive elements; and
a steering control system comprising processing circuitry configured to:
receive a steering input indicating a commanded curvature to be performed by the agricultural vehicle;
determine, based on the steering input and utilizing a primary curvature model of the agricultural vehicle, at least one steering condition of the steering input device to perform the commanded curvature, wherein the primary curvature model comprises a non-linear relationship between curvatures and steering conditions of the steering input device;
operate the steering input device according to the at least one steering condition such that the agricultural vehicle performs the commanded curvature;
generate a calibration curvature model following the steps of:
obtaining curvature data as the agricultural vehicle performs the commanded curvature;
generating, based on the curvature data and the at least one steering condition, the calibration curvature model; and
responsive to a current steering condition of the steering input device being within a center range corresponding to the steering input device steering the agricultural vehicle substantially straight, modify a primary curvature portion of the primary curvature model to correspond to a calibration curvature portion of the calibration curvature model.

2. The agricultural vehicle of claim 1, wherein, prior to determining the at least one steering condition, the primary curvature model is obtained following the steps of:
obtaining actual steering condition data corresponding to actual steering conditions of the steering input device;
obtaining actual curvature data corresponding to actual curvatures performed by the agricultural vehicle;
generating, based on the actual steering condition data and the actual curvature data, the primary curvature model that predicts steering conditions data given commanded curvatures; and
determining that the primary curvature model has converged.

3. The agricultural vehicle of claim 2, wherein the primary curvature model is a third-degree polynomial function.

4. The agricultural vehicle of claim 1, wherein, responsive to a deviation between the primary curvature model and the calibration curvature model exceeding a threshold, the processing circuitry is further configured to:
perform at least one of generating an alert or stop determining the at least one steering condition utilizing the primary curvature model.

5. The agricultural vehicle of claim 1, wherein the steering control system is a retrofit system configured to be installed to control the steering input device of the agricultural vehicle.

6. The agricultural vehicle of claim 1, wherein:
the primary curvature model is a first polynomial function with a first constant, the primary curvature portion being the first constant; and
the calibration curvature model is a second polynomial function with a second constant, the calibration curvature portion being the second constant.

7. The agricultural vehicle of claim 1, wherein the processing circuitry is further configured to:
receive an updated steering input indicating an updated commanded curvature to be performed by the agricultural vehicle;
determine, based on the updated steering input and utilizing the modified primary curvature model, at least one updated steering condition of the steering input device to perform the updated commanded curvature; and
operate the steering input device according to the at least one updated steering condition such that the agricultural vehicle performs the updated commanded curvature.

8. A steering control system configured to operate a steering input device of an agricultural vehicle to perform a turn, the steering control system comprising processing circuitry configured to:
receive a steering input indicating a commanded curvature to be performed by the agricultural vehicle;
determine, based on the steering input and utilizing a primary curvature model of the agricultural vehicle, at least one steering condition of the steering input device to perform the commanded curvature;
operate the steering input device according to the at least one steering condition such that the agricultural vehicle performs the commanded curvature;
generate a calibration curvature model following the steps of:
obtaining curvature data as the agricultural vehicle performs the commanded curvature;
generating, based on the curvature data and the at least one steering condition, the calibration curvature model; and
responsive to a current steering condition of the steering input device being within a range, modify a primary curvature portion of the primary curvature model to correspond to a calibration curvature portion of the calibration curvature model.

9. The steering control system of claim 8, wherein prior to determining the at least one steering condition, the primary curvature model is obtained following the steps of:
obtaining actual steering condition data corresponding to actual steering conditions of the steering input device;
obtaining actual curvature data corresponding to actual curvatures performed by the agricultural vehicle;
generating, based on the actual steering condition data and the actual curvature data, the primary curvature model that predicts steering conditions given commanded curvature; and
determining that the primary curvature model has converged.

10. The steering control system of claim 9, wherein the primary curvature model is a third-degree polynomial function.

11. The steering control system of claim 8, wherein, responsive to a deviation between the primary curvature model and the calibration curvature model exceeding a threshold, the processing circuitry is further configured to:

perform at least one of generating an alert or stop determining the at least one steering condition utilizing the primary curvature model.

12. The steering control system of claim 8, wherein the steering control system is a retrofit system configured to be installed to control the steering input device of the agricultural vehicle.

13. The steering control system of claim 8, wherein:
the primary curvature model is a first polynomial function with a first constant, the primary curvature portion being the first constant; and
the calibration curvature model is a second polynomial function with a second constant, the calibration curvature portion being the second constant.

14. The steering control system of claim 8, wherein the processing circuitry is further configured to:
receive an updated steering input indicating an updated commanded curvature to be performed by the agricultural vehicle;
determine, based on the updated steering input and utilizing the modified primary curvature model, at least one updated steering condition of the steering input device to perform the updated commanded curvature; and
operate the steering input device according to the at least one updated steering condition such that the agricultural vehicle performs the updated commanded curvature.

15. A method for steering an agricultural vehicle, the method comprising;
receiving a steering input indicating a commanded curvature to be performed by the agricultural vehicle;
determining, based on the steering input and utilizing a primary curvature model of the agricultural vehicle, at least one steering condition of the agricultural vehicle to perform the commanded curvature;
operating the agricultural vehicle according to the at least one steering condition such that the agricultural vehicle performs the commanded curvature;
generating a calibration curvature model following the steps of:
obtaining curvature data as the agricultural vehicle performs the commanded curvature;
generating, based on the curvature data and the at least one steering condition, the calibration curvature model; and
responsive to a current steering condition of the agricultural vehicle steering the agricultural vehicle substantially straight, modifying a primary curvature portion of the primary curvature model to correspond to a calibration curvature portion of the calibration curvature model.

16. The method of claim 15, wherein, prior to determining the at least one steering condition, the primary curvature model is obtained following the steps of:
obtaining actual steering condition data corresponding to actual steering conditions of the agricultural vehicle;
obtaining actual curvature data corresponding to actual curvatures of performed by the agricultural vehicle;
generating, based on the actual steering condition data and the actual curvature data, the primary curvature model that predicts steering conditions given commanded curvature data; and
determining that the primary curvature model has converged.

17. The method of claim 16, wherein the primary curvature model is a third-degree polynomial function.

18. The method of claim 16, further comprising:
responsive to a deviation between the primary curvature model and the calibration curvature model exceeding a threshold, performing at least one of generating an alert or stop determining the at least one steering condition utilizing the primary curvature model.

19. The method of claim 15, wherein:
the primary curvature model is a first polynomial function with a first constant, the primary curvature portion being the first constant; and
the calibration curvature model is a second polynomial function with a second constant, the calibration curvature portion being the second constant.

20. The method of claim 15, further comprising:
receiving an updated steering input indicating an updated commanded curvature to be performed by the agricultural vehicle;
determining, based on the updated steering input and utilizing the modified primary curvature model, at least one updated steering condition of the agricultural vehicle to perform the updated commanded curvature; and
operating the agricultural vehicle according to the at least one updated steering condition such that the agricultural vehicle performs the updated commanded curvature.

* * * * *